US008213056B2

(12) United States Patent
Tsutsumi

(10) Patent No.: US 8,213,056 B2
(45) Date of Patent: Jul. 3, 2012

(54) IMAGE PROCESSING APPARATUS AND LINE PAIR PATTERN IDENTIFICATION METHOD

(75) Inventor: Takahiro Tsutsumi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 755 days.

(21) Appl. No.: 12/390,707

(22) Filed: Feb. 23, 2009

(65) Prior Publication Data

US 2009/0213438 A1 Aug. 27, 2009

(30) Foreign Application Priority Data

Feb. 25, 2008 (JP) ................................. 2008-043000
Nov. 26, 2008 (JP) ................................. 2008-301504

(51) Int. Cl.
*H04N 1/405* (2006.01)

(52) U.S. Cl. ........................ 358/3.07; 358/3.06; 347/131

(58) Field of Classification Search ................. 358/3.07, 358/1.9, 458, 459, 1.3, 3.06, 3.3, 502, 1.16, 358/2.1; 347/1.3, 131
See application file for complete search history.

(56) References Cited

U.S. PATENT DOCUMENTS

| | | | | |
|---|---|---|---|---|
| 6,266,154 B1 * | 7/2001 | Allen | ............................ | 358/3.06 |
| 6,597,472 B1 * | 7/2003 | Suzuki et al. | ................... | 358/1.9 |
| 7,292,368 B2 * | 11/2007 | Rozzi | ............................ | 358/1.3 |
| 2004/0165200 A1 | 8/2004 | Nabeshima | | |

FOREIGN PATENT DOCUMENTS

| | | |
|---|---|---|
| JP | 10-093815 | 4/1998 |
| JP | 2000-224421 | 8/2000 |
| JP | 2003-076993 A | 3/2003 |
| JP | 2004-228745 | 8/2004 |
| JP | 2004-260523 | 9/2004 |
| JP | 2004-328292 | 11/2004 |
| JP | 2006-197239 | 7/2006 |
| JP | 2006-287603 A | 10/2006 |

OTHER PUBLICATIONS

Notification of Reason(s) for Refusal issued in the corresponding Japanese Patent Application No. 2008-301504 dated Dec. 22, 2009, and an English Translation thereof.

* cited by examiner

*Primary Examiner* — Charlotte M Baker
(74) *Attorney, Agent, or Firm* — Buchanan Ingersoll & Rooney PC

(57) ABSTRACT

An image processing apparatus is provided with a line pair identification unit that includes: a binarization portion that binarizes image data generated by a reading unit reading a document; a detection portion that detects, in an image based on the binarized image data, a line screen pattern in a first direction and a line screen pattern in a second direction that is orthogonal to the first direction; a determination portion that determines the periodicity of the line screen pattern in the first direction; and an identification portion that identifies whether or not a line pair pattern is present in the image data based on the difference in the number between the two line screen patterns as detected by the detection portion and the results of the determination performed by the determination portion.

23 Claims, 13 Drawing Sheets

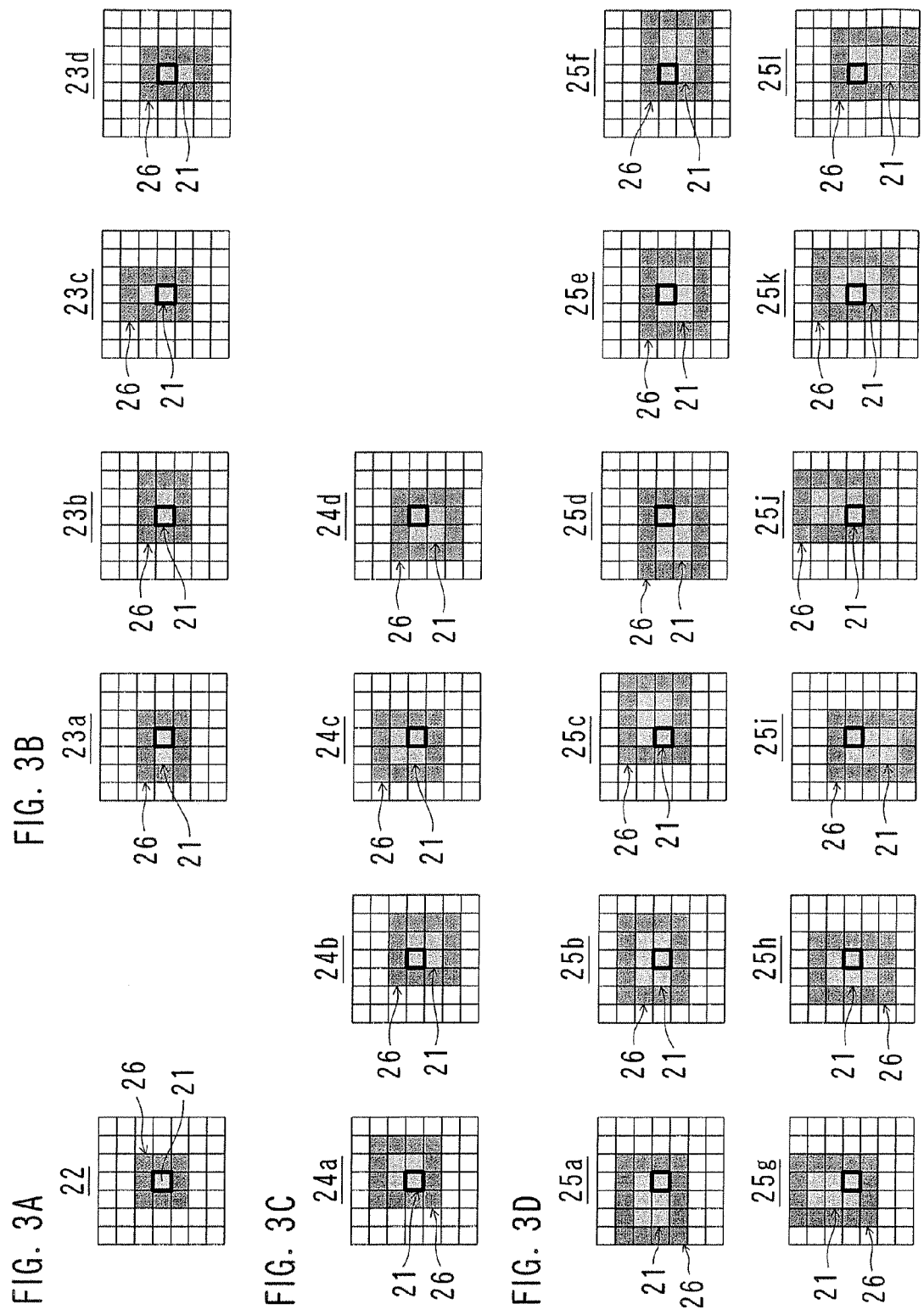

IMAGE PROCESSING APPARATUS AND LINE PAIR PATTERN IDENTIFICATION METHOD

This application is based on Japanese Patent Application Nos. 2008-043000 and 2008-301504 filed on Feb. 25, 2008 and Nov. 26, 2008, respectively, the contents of which are hereby incorporated by reference.

BACKGROUND OF THE INVENTION

1. Field of the Invention

The present invention relates to an image processing apparatus used in an image forming apparatus such as an MFP, and to an identification method for a line pair pattern that includes a line screen pattern.

2. Description of the Related Art

An image forming apparatus that forms images using the electrophotographic method, such as, for example, a photocopier, a printer, a facsimile, and an apparatus with multiple functions (called an MFP, or multi-function peripheral), may be provided with an image processing apparatus that performs a halftone region identification process to identify halftone regions in a document, enabling the image processing apparatus to execute a smoothing process for preventing the occurrence of moiré patterns during printout (see Patent Document 1: JP 2006-287603A).

Focusing on the characteristic that halftones are made up of individual dots, the stated halftone region identification process identifies the individual dots in an inputted color image, and determines whether or not those individual dots constitute a halftone.

There is proposed a method for detecting an inclination of an image obtained by reading an original (see Patent Document 2: JP2003-076993A). The method involves calculating an angle at which straight lines are concentrated based on coordinate conversion values of pixels of a binary image or a multi-valued image, and detecting the inclination of the image based on the calculated angle.

However, the method disclosed in Patent Document 1 cannot detect the individual dots found in line screen patterns (line screen shapes) in which individual dots have been linearly connected, line pair patterns (line pair shapes) configured of plural line screen patterns that have been arranged evenly, and so on, and therefore cannot identify such line screen patterns and line pair patterns as halftones (halftone regions).

As a result, the smoothing process is not executed on the line screen patterns and line pair patterns that could not be identified as halftones. In addition, there are cases where line screen patterns and line pair patterns that have not been identified as halftones by the region identification process are identified as characters, and the edges thereof are enhanced in a subsequent edge enhancement process.

For this reason, a noticeable visual difference arises between regions identified as halftones and on which smoothing has been carried out, and regions which are halftones but have had edge enhancement carried out rather than smoothing (that is, the stated line screen patterns and the like).

The method disclosed in Patent Document 2 causes the increase in data amount and processing time, because the method involves performing coordinate conversion on each pixel of an inputted image.

SUMMARY

Having been conceived in light of such problems, it is an object of the present invention to identify line pair patterns appropriately.

According to one aspect of the present invention, an image processing apparatus includes a reader that reads a document and generates image data, a detector that detects a line screen pattern in a first direction in an image based on the image data generated by the reader and a line screen pattern in a second direction that is orthogonal to the first direction, and an identifier that identifies whether or not a line pair pattern is present in the image data based on the difference in the number of the two line screen patterns detected by the detector.

Preferably, the line screen pattern may be a linear pattern configured of individual dots that have been connected, and the line pair pattern may be a pattern configured of plural line screen patterns that have been arranged evenly.

Further, the image processing apparatus may include a binarization portion that binarizes the image data. The detector may detect the number of transition points between ON-pixels and OFF-pixels in the first direction and the number of transition points between ON-pixels and OFF-pixels in the second direction of an image based on the image data binarized by the binarization portion, and the identifier may identify whether or not a line pair pattern is present in the image data based on the difference in the number of transition points between ON-pixels and OFF-pixels in the first direction and the number of transition points between ON-pixels and OFF-pixels in the second direction.

Further, the image processing apparatus may further include a binarization portion that binarizes the image data. The detector may detect the number of transition points between ON-pixels and OFF-pixels in a plurality of directions in an image based on the image data binarized by the binarization portion. The detector may include a line pair angle calculation portion that determines an inclination of a line pair pattern based on the detected number of transition points between ON-pixels and OFF-pixels in the plurality of directions, and a line pair transition number calculation portion that determines the number of transition points between ON-pixels and OFF-pixels in a direction orthogonal to the line pair pattern based on the determined inclination. The identifier may identify whether or not a line pair pattern is present in the image data based on the number of transition points between ON-pixels and OFF-pixels in the direction orthogonal to the line pair pattern.

BRIEF DESCRIPTION OF THE DRAWINGS

FIGS. 3A to 3D are diagrams illustrating individual dot identification filters for identifying individual dots.

DESCRIPTION OF THE PREFERRED EMBODIMENTS

First Embodiment

An image processing apparatus 1 according to the first embodiment is used in an image forming apparatus such as an MFP (multi-function peripheral), in which a scanner unit and a printer unit are integrated into a single unit.

Figure 1:
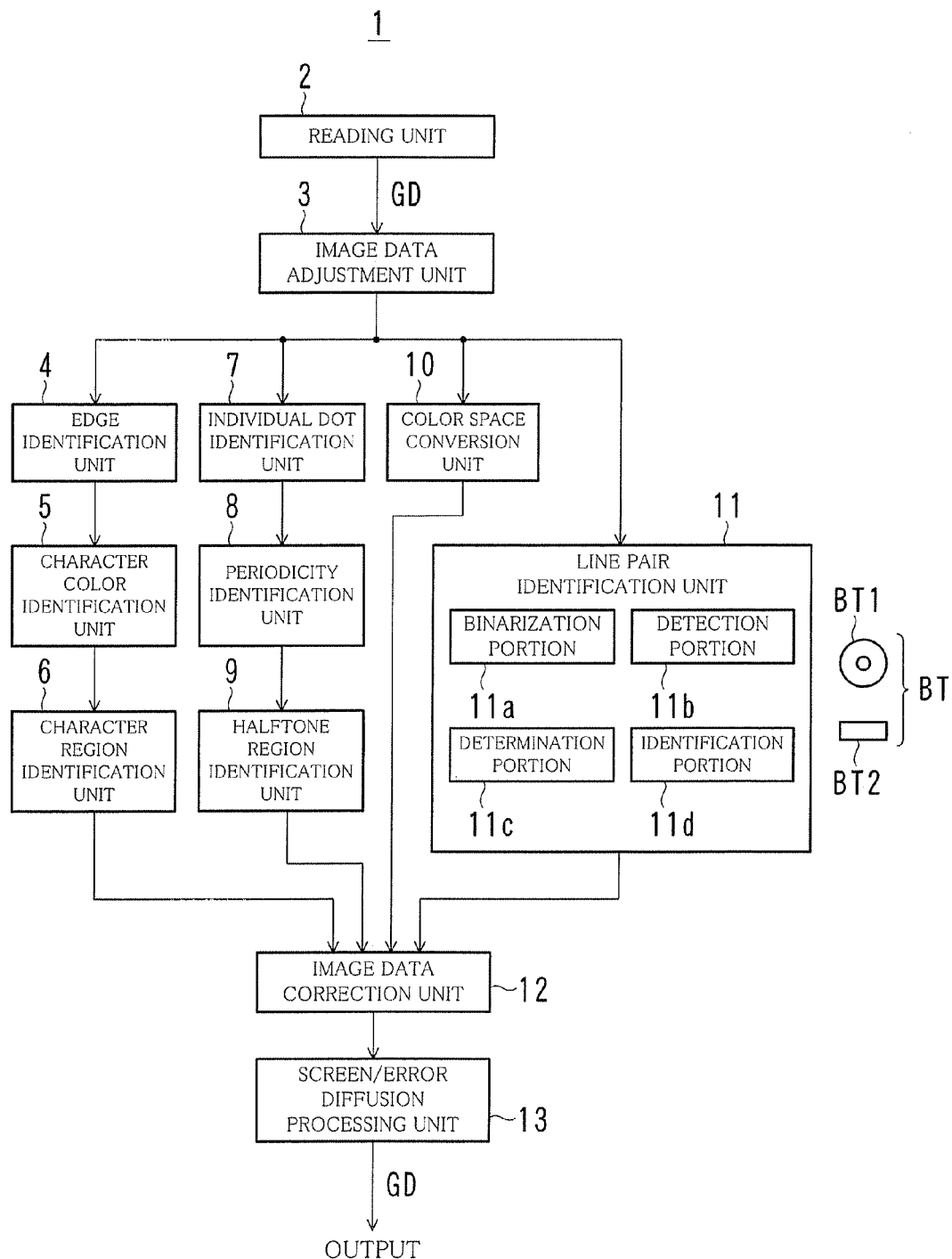
FIG. 1 is a block diagram illustrating the configuration of an image processing apparatus according to a first embodiment of the present invention.

As illustrated in FIG. 1, the image processing apparatus 1 is configured of: a reading unit 2; an image data adjustment unit 3; an edge identification unit 4; a character color identification unit 5; a character region identification unit 6; an individual dot identification unit 7; a periodicity determination unit 8; a halftone region identification unit 9; a color space conversion unit 10; a line pair identification unit 11; an image data correction unit 12; a screen/error diffusion processing unit 13; and so on.

CPUs, memories, other types of circuit elements, and so on are used for the constituent elements of the image processing apparatus 1 described above. These may be entirely or partially integrated as ICs and used as, for example, microprocessors, ASICs (Application-Specific Integrated Circuits), or the like. A computer program for realizing the functions of the line pair identification unit 11 is stored in such a memory. This type of program can be installed from a portable recording medium BT, which includes a recording medium BT1, such as a CD-ROM, DVD-ROM, or the like, or a recording medium BT2, such as a semiconductor memory or the like, the recording medium having the program recorded therein. The program may also be downloaded from a server via a network.

The line pair identification unit 11 includes: a binarization portion 11a that binarizes the image data generated by the reading unit 2 reading a document; a detection portion 11b that detects, in an image based on the binarized image data, a line screen pattern in a first direction and a line screen pattern in a second direction that is orthogonal to the first direction; a determination portion 11c that determines the periodicity of the line screen pattern in the first direction; and an identification portion 11d that identifies whether or not a line pair pattern is present in the image data based on the difference between the two line screen patterns as detected by the detection portion 11b and the results of the determination performed by the determination portion 11c.

The reading unit 2, configured of a CCD (charge-coupled device), a mirror, document glass, and so on, reads a document and generates image data GD based on the read document.

The image data adjustment unit 3 performs a base-skipping process, tint adjustment, and so on on the image data GD. The "base-skipping process" refers to deleting the base from the image data GD by subtracting a base level (the signal level of the base) from the image data GD. For example, when duplicating a document that includes regions in which the base is not white, such as newspapers, colored paper, and the like, those regions can be made white in the duplicate by using the base-skipping process. "Tint adjustment", meanwhile, is a process that adjusts the rate of change in chromaticity points.

The edge identification unit 4 identifies whether or not the image (image data) is on an edge. The character color identification unit 5 identifies whether the image is of a character, and if so, whether that character is a white character, color character, or black character. The character region identification unit 6 identifies a character region in the image based on the results of the identification performed by the edge identification unit 4 and the character color identification unit 5.

The individual dot identification unit 7 identifies whether or not the image is made up of individual dots. The periodicity determination unit 8 determines the periodicity of individual dots using a periodicity determination filter. The halftone region identification unit 9 identifies a halftone region based on the results of the identification performed by the individual dot identification unit 7 and the results of the determination performed by the periodicity determination unit 8.

The color space conversion unit 10 converts the image data GD from the RGB color system to image data GD in the Y (yellow), M (magenta), C (cyan), K (black) color system. The line pair identification unit 11 identifies whether the image is a line screen pattern (line screen shape) or a line pair pattern (line pair shape). A line screen pattern is a linear pattern in which individual dots are connected, whereas a line pair pattern is configured of plural line screen patterns that have been arranged evenly. This shall be described in detail later.

The image data correction unit 12 carries out an edge enhancement process, a smoothing process, and so on based on the results of the identification and determination performed by the elements described above. "Edge enhancement process" refers to a process for enhancing the edges of characters in order to improve the visibility of the characters, whereas "smoothing process" refers to a process for setting the lightness values or the intensity values of the pixels in a halftone region so that changes in the lightness (intensities) between adjacent pixels are smoothed. The occurrence of moiré patterns during printing is prevented by carrying out this smoothing process.

The screen/error diffusion processing unit 13 carries out screen processing, error diffusion processing, and so on on the image data GD, converting the image data GD into a data format to be printed by a printer unit (print engine). Copy paper on which an image based on the image data GD has been formed by the printer unit is then outputted.

Figure 2:
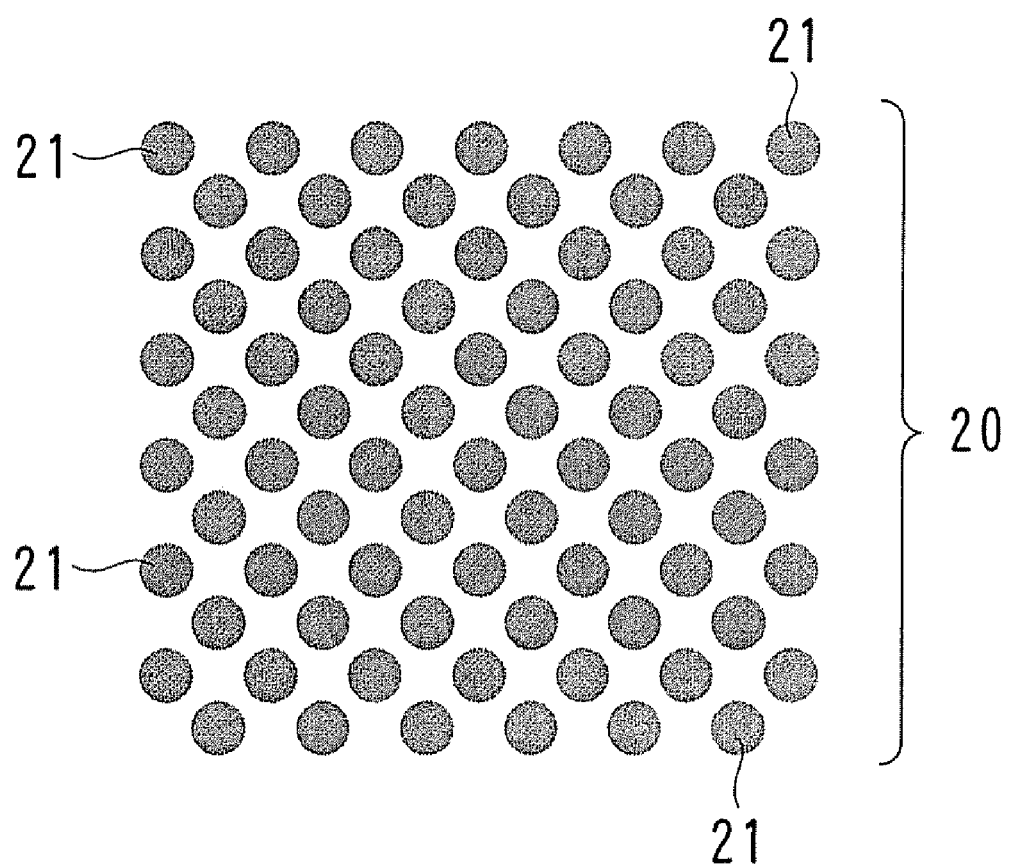
FIG. 2 is a diagram illustrating a halftone, which is a collection of individual dots.

As illustrated in FIG. 2, a halftone 20 is generally defined as being composed of a plurality of individual dots 21, which are less than or equal to a predetermined size and are arranged evenly within a predetermined density range.

The following can be given as examples of individual dot identification filters for identifying the individual dots 21: an individual dot identification filter 22 (FIG. 3A) for identifying when the pixel of interest is in an individual dot 21 made up of 1×1 pixels; individual dot identification filters 23a to 23d (FIG. 3B) for identifying when the pixel of interest is in an individual dot 21 made up of 2×1 pixels; individual dot identification filters 24a to 24d (FIG. 3C) for identifying when the pixel of interest is in an individual dot 21 made up of 2×2 pixels; and individual dot identification filters 25a to 25l (FIG. 3D) for identifying when the pixel of interest is in an individual dot 21 made up of 2×3 pixels.

Furthermore, there are two types of individual dots 21: those called "black individual dots" and those called "white individual dots". "Black individual dots" refers to individual dots 21 for which the tone is lower (darker) than that of surrounding pixels 26, whereas "white individual dots" refers to individual dots 21 for which the tone is higher (brighter) than that of the surrounding pixels 26.

To be more specific, an individual dot 21 is determined to be a black individual dot when a black individual dot peak amount, indicated by the difference obtained by subtracting the average tone value (the average lightness value) of the individual dot 21 from the minimum tone value (the minimum lightness value) of the surrounding pixels 26, exceeds 0. In other words, an individual dot 21 is determined to be a black individual dot when it is darker than all of the surrounding pixels 26. On the other hand, an individual dot 21 is determined to be a white individual dot when a white individual dot peak amount, indicated by the difference obtained by subtracting the minimum tone value (the minimum lightness value) of the surrounding pixels 26 from the average tone value (the average lightness value) of the individual dot 21, exceeds 0. In other words, an individual dot 21 is determined to be a white individual dot when it is brighter than all of the surrounding pixels 26. If the stated differences are negative, they are clipped at 0.

With a line screen pattern (line pair pattern), in which individual dots that constitute a halftone are connected to adjacent individual dots in a certain direction, the surrounding pixels do not have a sufficient tonal difference relative to the individual dots, and thus it is difficult to identify the individual dots using the individual dot identification filters 22 to 25 illustrated in FIG. 3. Accordingly, a method capable of accurately identifying line pair patterns shall be described hereinafter.

Figure 4A:
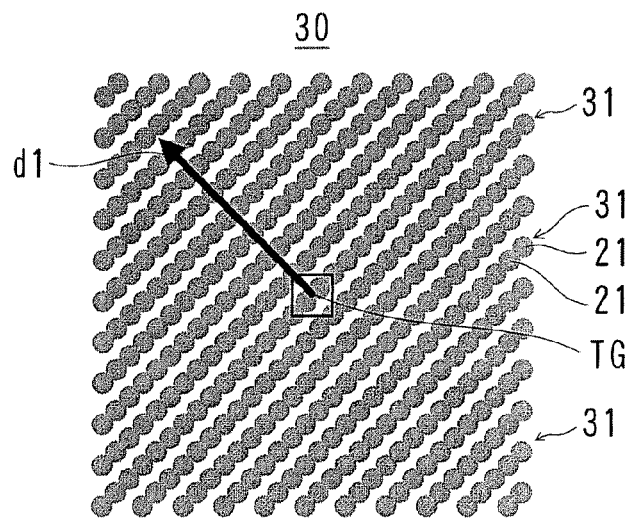
FIGS. 4A to 4C are diagrams illustrating a method for identifying a line pair pattern.
Figure 4B:
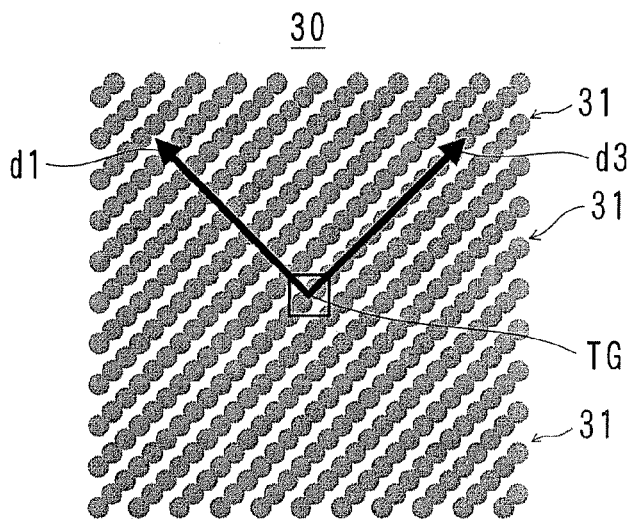
Figure 4C:
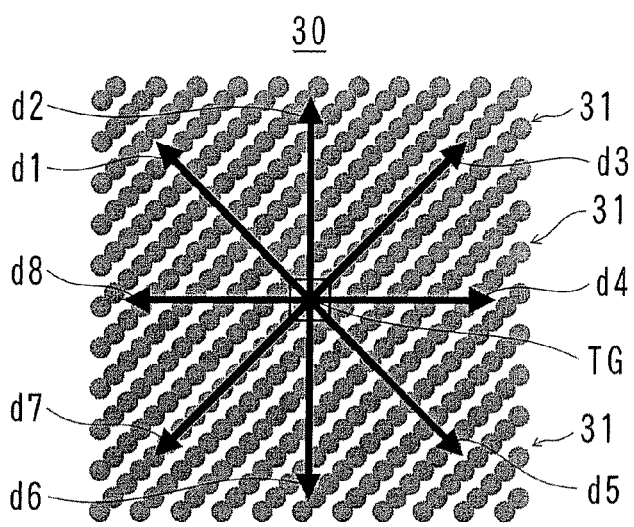

FIGS. 4A, 4B, and 4C are diagrams illustrating a method for identifying a line pair pattern. As illustrated in FIG. 4A, a line pair pattern 30 is composed of a plurality of evenly-arranged line screen patterns 31, which are in turn made up of individual dots 21 connected to one another.

With the line pair pattern 30, viewing line screen patterns 31 from a direction (not shown) that intersects with line screen patterns 31 at a certain angle shows that pixels of low tone (dark pixels) (that is, the pixels that make up the line screen patterns 31) and pixels of high tone (bright pixels) are arranged evenly in a repetitious manner.

The number of such repetitions in a region of a certain length in the line pair pattern 30 is greatest when counted in a direction d1, which takes a pixel of interest TG as its origin and intersects with the line screen patterns 31 at a right angle. The number of lines that make up the line pair pattern 30, or in other words, the number of line screen patterns 31, can be obtained from this number of repetitions.

Next, as illustrated in FIG. 4B, the pixels counted in a direction d3, which is orthogonal to the direction d1 (d1 being perpendicular to the line screen pattern 31), all have low tones; pixels with high tones do not exist in this direction. The number of repetitions in this direction is therefore 0.

Accordingly, it can be seen that the difference between a number of repetitions M found in a direction that intersects with the line screen patterns 31 at a certain angle and a number of repetitions N found in the direction orthogonal to the stated direction (in other words, M-N) is greater in the line pair pattern 30 than in other patterns (for example dot patterns or the like).

An identification method (identification algorithm), used by the line pair identification unit 11 of FIG. 1 in order to identify the line pair pattern 30, shall be described hereinafter. In the present embodiment, a first condition and a second condition, discussed later, are set as conditions for identifying the line pair pattern 30.

First, the image data GD is binarized in order to facilitate the counting of the aforementioned numbers of repetitions M and N. A value obtained by calculating the maximum and minimum tone values of pixels in a certain region and dividing the sum of the calculated maximum and minimum tone values by 2 can be used as a threshold th1 for the binarization process.

Next, the aforementioned number of repetitions M, or in other words, the number of transitions between pixels with low tones and pixels with high tones (called "transition points" hereinafter) in a direction that intersects with the line screen patterns 31 at a certain angle in the line pair pattern 30, is counted.

In other words, the number of transition points between ON-pixels and OFF-pixels, i.e., the number of on-off transitions is counted in binarized image data. The same applies to the number of transitions between "H" and "L", and the number of transitions between "1" and "0". Hereinafter, the number of transition points may be simply referred to as "transition points".

For example, there are four transition points when the number of dots in the direction that intersects with the line screen patterns 31 at a certain angle is 3.

As shown in FIG. 4C, eight directions, or directions d1 through d8, are set at 45-degree angle intervals radiating out from the pixel of interest TG, which serves as an origin; these directions are used as directions in which to count the transition points. In FIG. 4C, a number found by multiplying the number of pixels to be counted in directions d2, d4, d6, and d8 by $1/\sqrt{2}$ is used as the number of pixels to be counted in directions d1, d3, d5, and d7, so that the regions to be counted (counted regions) is the same in all directions. Note, however, that the directions in which to count the transition points can be arbitrarily set; for example, plural directions can be arranged at 22.5-degree angle intervals, 11.25-degree angle intervals, and so on.

In the present embodiment, the transition points are counted in the directions d1 through d8. The direction in which the number of counted transition points is greatest is then acquired. The number of transition points in the direction in which that number of transition points is greatest is taken as m (where m is an integer) hereinafter. In FIG. 4C, it is assumed that the number of transition points in the direction d2 is greatest, and thus that number of transition points is taken as m.

The first condition for identifying the line pair pattern 30 is that the relationship "transition points m>reference value Q" is satisfied, or in other words, that the number of transition points m is greater than a reference value Q.

For example, the number of transition points m according to the first condition is counted in the following manner, and the reference value Q is set in the manner described below.

Here, we will consider a case where the line pair pattern 30 is detected in a 150 lpi (lines per inch) document scanned by the reading unit 2 at a reading resolution (scanning resolution) of 600 dpi (dots per inch). Note that the length of the region in the direction d2 in which the transition points are counted is assumed to be 30 dots long at 600 dpi resolution, or in other words, approximately 1.25 mm in length.

The reference value Q expresses the number of transition points in a 150 lpi document, present within a region 30 dots long at 600 dpi resolution (approximately 1.25 mm). It can therefore be found through the formula 150÷20×2−1, which results in 14.

Furthermore, the region in which the transition points are counted in the direction d2 is 30 dots in length, and thus the number of transition points m can be found through the formula 30×2−1, which results in 59. Note that the reason for subtracting 1 during the calculations of the reference value Q and the number of transition points m is so that the first pixel (dot) is excluded from the count.

In this case, the number of transition points m (59) is greater than the reference value Q (14), and thus the first condition is satisfied.

Meanwhile, the second condition for identifying the line pair pattern 30 is that the number of transition points in either the direction d8 or the direction d4, which are orthogonal to the direction d2 in which the number of transition points is m, is the minimum value among the numbers of transition points in directions d1 through d8.

If the abovementioned first and second conditions are satisfied, the line pair pattern 30 is identified as being present in the image data GD.

However, there are cases where it is difficult to identify the line pair pattern 30 based only on the first and second conditions.

Figure 5:
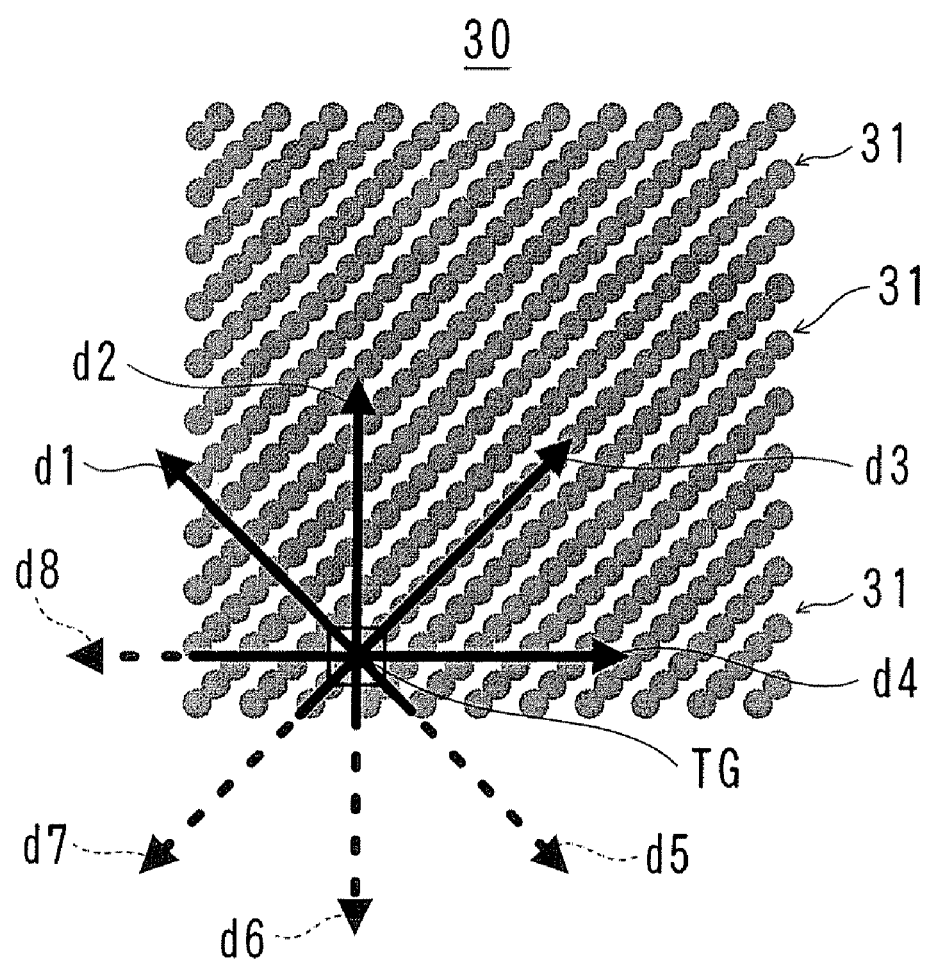
FIG. 5 is a diagram illustrating a state in which some counted regions in eight directions extend out of a line pair pattern.

FIG. 5 is a diagram illustrating a state in which some counted regions in directions d1 through d8 extend out of the line pair pattern 30.

As illustrated in FIG. 5, while the counted regions in directions d1 through d4 are present within the line pair pattern 30, the counted regions in directions d5 through d8 (see FIG. 4C) extend out of the line pair pattern 30. As a result, the aforementioned second condition cannot be properly determined. However, the following method can be used in order to solve this problem.

The method in question calculates the total number of transition points in four successive directions, the calculation being performed eight times on four different sets of directions. Accordingly, in the present example, the total number of transition points in directions d2, d3, d4, and d5 is calculated as a first total value; the total number of transition points in directions d3, d4, d5, and d6 is calculated as a second total value; the total number of transition points in directions d4, d5, d6, and d7 is calculated as a third total value; the total number of transition points in directions d5, d6, d7, and d8 is calculated as a fourth total value; the total number of transition points in directions d6, d7, d8, and d1 is calculated as a fifth total value; the total number of transition points in directions d7, d8, d1, and d2 is calculated as a sixth total value; the total number of transition points in directions d8, d1, d2, and d3 is calculated as a seventh total value; and the total number of transition points in directions d1, d2, d3, and d4 is calculated as an eighth total value.

The greatest total value is then selected from among the first through eighth total values. This is because it is more likely that the counted regions in each direction in the selected combination are present within the line pair pattern 30 when the combination in which the total number of transition points is the greatest is selected.

In FIG. 5, it is assumed that the total number of transition points in directions d1, d2, d3, and d4 (that is, the eighth total value) is the greatest. The number of transition points that is the greatest among the transition points in directions d1, d2, d3, and d4 is taken as m, and it is then determined whether or not that number of transition points m exceeds the reference value Q (the first condition). Note that in FIG. 5, it is assumed that the number of transition points in direction d1 is the greatest.

In addition to the first condition, it is determined whether or not the number of transition points in direction d3, which is orthogonal to the direction d1, is the minimum among the transition points in the aforementioned four directions (the second condition).

However, the following problem arises when directions set at 45-degree angle intervals based on the pixel of interest TG, which serves as an origin, are employed as described above, but a line pair pattern 30a, obtained by slanting each line screen pattern 31 clockwise by 22.5 degrees relative to the vertical, undergoes identification.

Figure 6:
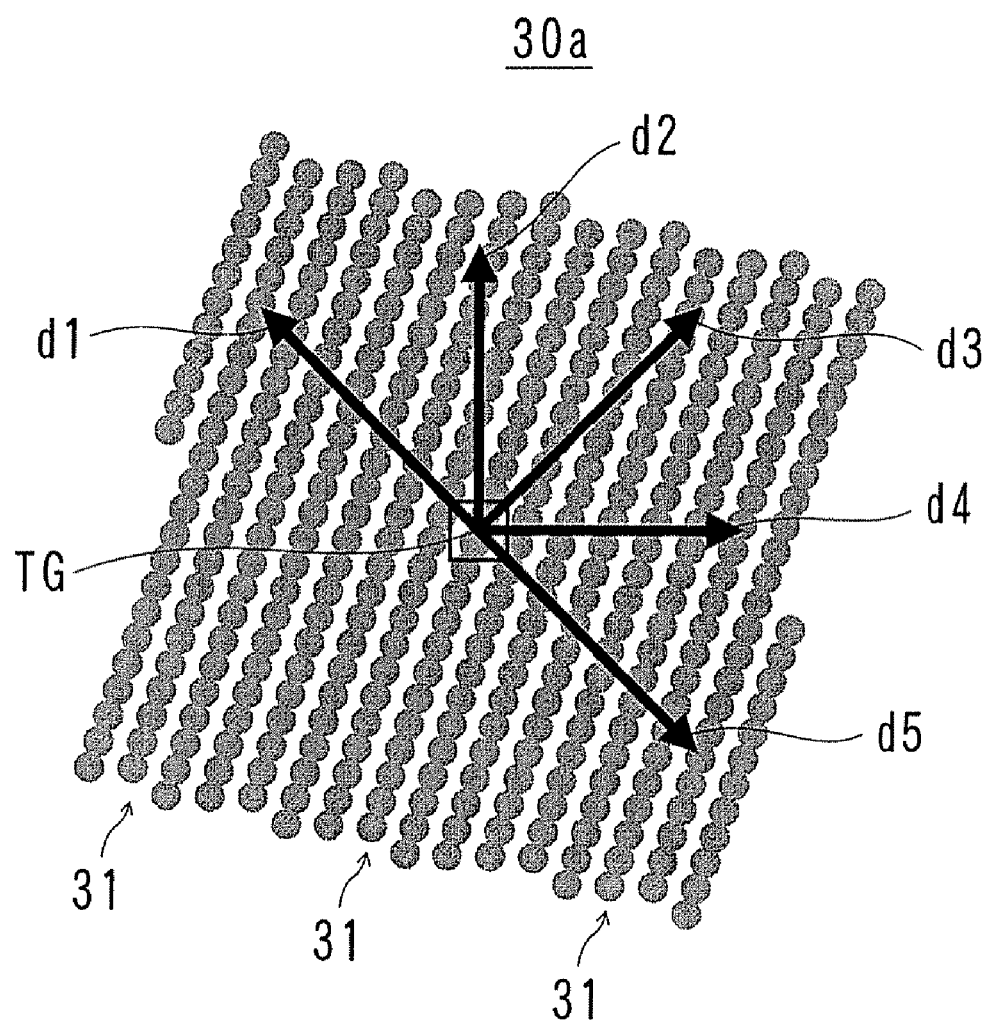
FIG. 6 is a diagram illustrating another method for identifying a line pair pattern.

FIG. 6 is a diagram illustrating a method for identifying the line pair pattern 30a. With the line pair pattern 30a illustrated in FIG. 6, each line screen pattern 31 is slanted clockwise by 22.5 degrees relative to the vertical (not shown). In this case, an inclination α relative to the horizontal is 67.5 degrees.

In FIG. 6, it is assumed that the number of transition points in direction d1 is the greatest. The direction that is orthogonal to direction d1 is d3.

However, in the line pair pattern 30a, the number of transition points in direction d2 and the number of transition points in direction d3 are, theoretically speaking, the same number, and thus there are cases where the number of transition points in direction d2 is minimum, due to positional shift of the pixel of interest TG, fluctuations in the inputted image data GD, and so on. The result is that the second condition cannot be specified.

Accordingly, in a case such as this, the stated second condition is replaced with a condition stipulating that the number of transition points in the direction orthogonal to the direction in which the number of transition points is greatest is to be no greater than the maximum number of transition points divided by 2+α. This is so that the number of transition points in the direction orthogonal to the direction in which the number of transition points is greatest is theoretically no greater than ½ of the greatest number of transition points in the line pair pattern 30a. Note that α is a margin (an integer) that takes into account fluctuations in the image data GD arising during A/D conversion and so on.

Next, a third condition, for preventing characters from being mistakenly identified as the line pair pattern 30, shall be described.

Figure 7:
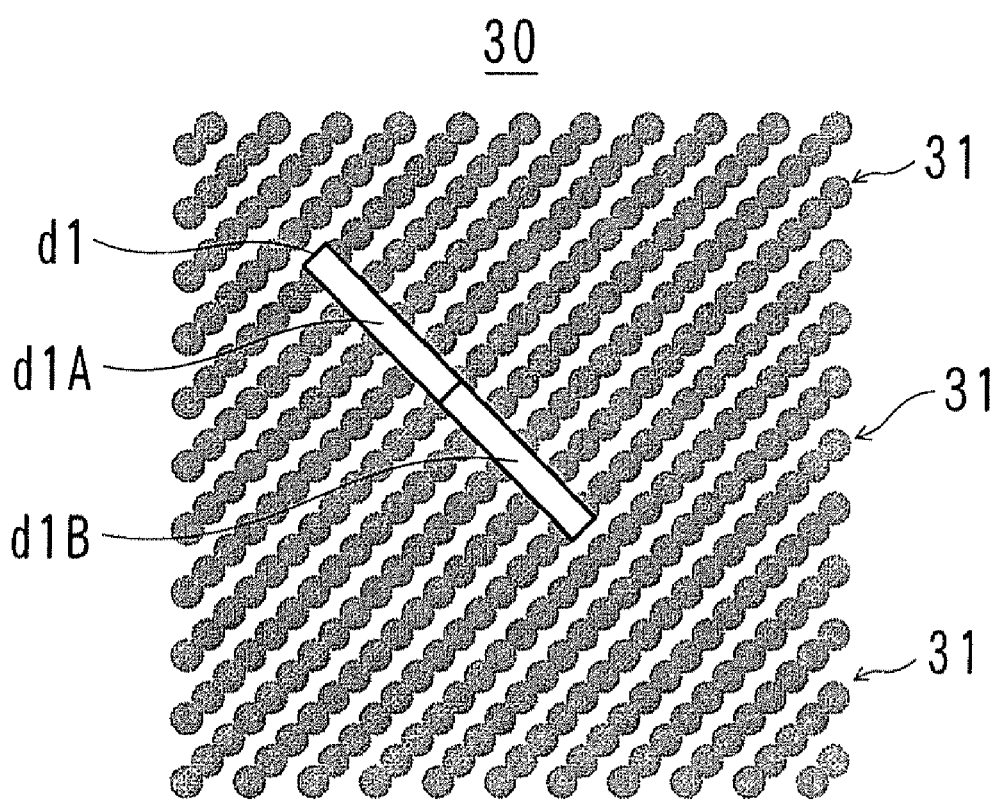
FIG. 7 is a diagram illustrating a third condition of a method for identifying a line pair pattern.

FIG. 7 is a diagram illustrating a third condition of a method for identifying the line pair pattern 30.

The third condition is employed because there are situations where an image made up of complex characters (such as, for example, Chinese characters composed of many strokes) rendered in a small font size (point size) satisfies the first and second conditions in areas, and it is therefore possible that those characters will be mistakenly identified as the line pair pattern 30.

With characters in a small font, it is considered unlikely that the transition points in the counted regions in each direction of the line pair pattern 30 are uniformly arranged at equal intervals; accordingly, the following periodicity condition is additionally employed as the third condition. The periodicity condition is a condition for identifying whether or not the transition points in the counted region are uniformly arranged at equal intervals.

Assuming that, as shown in FIG. 7, the counted region in the direction d1 in which the number of transition points is greatest is divided into two equal parts, or a counted region d1A and a counted region d1B, and the counted number of transition points in the two counted regions d1A and d1B are taken as p and q respectively (where p and q are integers), the third condition, or the periodicity condition, is that the absolute value of (p−q) is no greater than a predetermined threshold th2. If this third condition is satisfied, the number of transition points is considered to be uniformly arranged, and thus the line pair pattern 30 is identified as being present in the image data GD.

Next, a method for preventing a situation where a line pair pattern 30 is identified despite the fact that it is not actually a line pair pattern 30 shall be described.

Figure 8A:
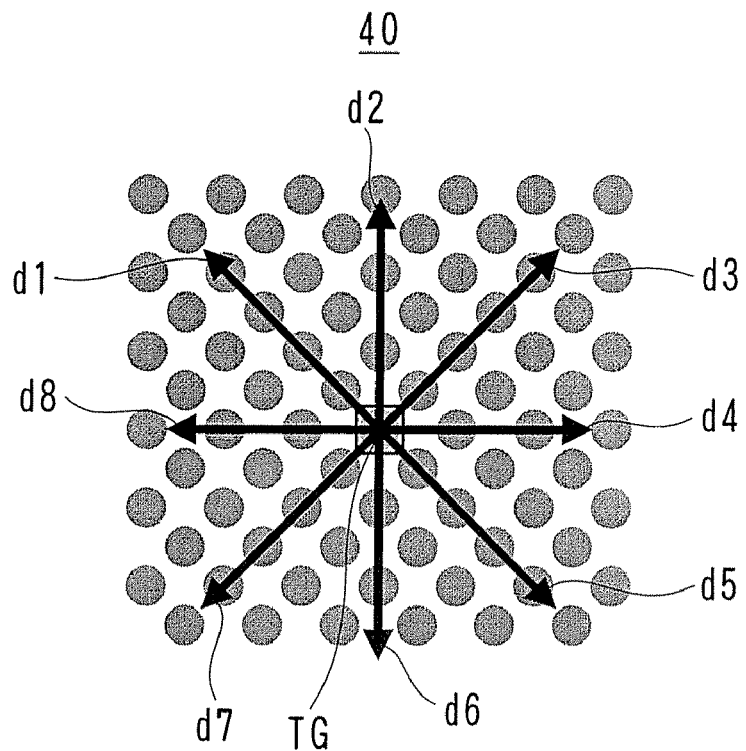
FIGS. 8A and 8B are diagrams illustrating the prevention of mistaken identification of a line pair pattern.
Figure 8B:
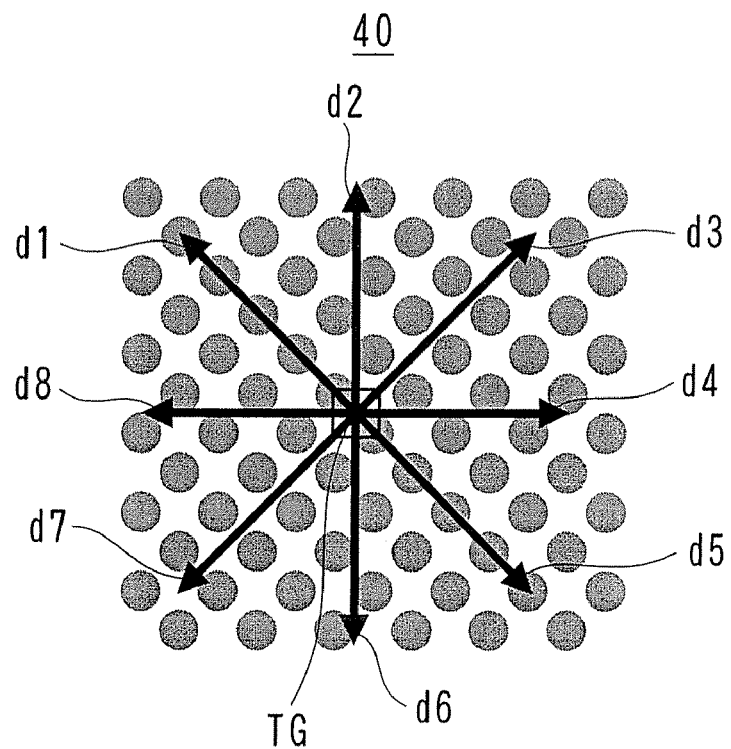

FIGS. 8A and 8B are diagrams illustrating a method for preventing the mistaken identification of the line pair pattern 30.

As shown in FIG. 8A, in a dot pattern 40 in which plural dots are arranged evenly, the number of transition points present in each of eight directions d1 through d8 starting with the pixel of interest TG is greater than or equal to a certain value; thus the abovementioned second condition is not satisfied.

However, as shown in FIG. 8B, situations arise, depending on the position of the pixel of interest TG, where the number of transition points in the direction orthogonal to the direction in which the number of transition points is greatest is a low number, such as 0. As a result, there are cases where first and second conditions are satisfied and the dot pattern 40 is mistakenly identified as a line pair pattern. Note that in this case, the entire halftone region of the dot pattern 40 is not mistakenly identified as the line pair pattern; rather, individual portions within the dot pattern 40 are mistakenly identified as line pair patterns.

An erosion process is performed on the image data GD in order to prevent this mistaken identification. This "erosion process" is a generic process for deleting dot regions in a predetermined matrix size, thereby reducing the size of that matrix.

Performing this erosion process prevents the dot pattern 40 from being mistakenly identified as a line pair pattern. If an opening process (a process for smoothing small bumps in the image) has been performed, a closing process (a process for smoothing small pits in the image) is performed after the erosion process in order to restore the line pair pattern 30, which has been temporarily reduced.

Figure 9:
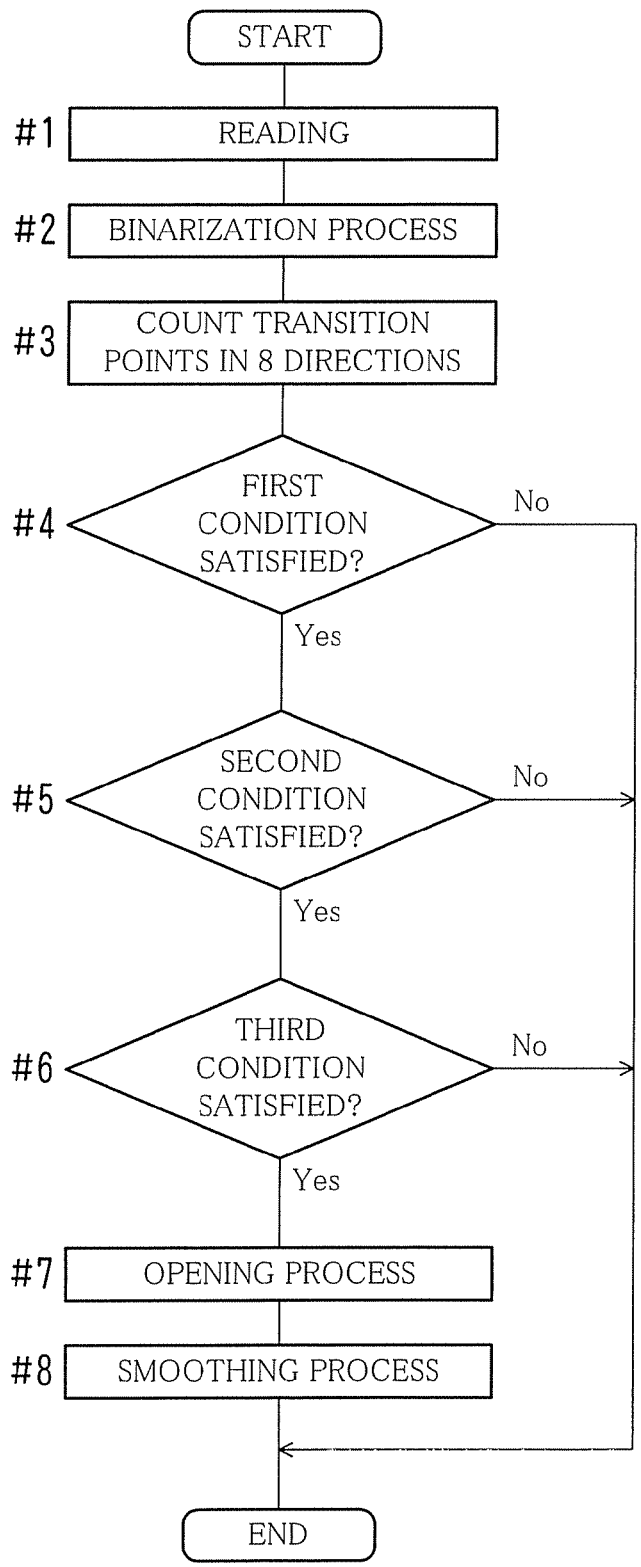
FIG. 9 is a flowchart illustrating a process for identifying a line pair pattern.

FIG. 9 is a flowchart illustrating a process for identifying the line pair pattern 30.

As shown in FIG. 9, a document is first read by the reading unit 2, and image data GD is generated (#1). Then, the generated image data GD is binarized (#2).

After this, the number of transition points in the counted regions in the eight directions d1 through d8 is counted (#3).

It is then determined whether or not the first condition is satisfied (#4). If it has been determined that the first condition is satisfied (Yes in #4), it is then determined whether or not the second condition is satisfied (#5). If it has been determined that the second condition is satisfied (Yes in #5), it is then determined whether or not the third condition is satisfied (#6). If the third condition is satisfied (Yes in #6), the image data GD is considered to include the line pair pattern 30, and thus an opening process (#7) and a smoothing process (setting the intensity values of the pixels so that changes in the lightness (intensities) between adjacent pixels are smoothed; #8) are carried out.

However, if the first condition is not satisfied (No in #4), the second condition is not satisfied (No in #5), or the third condition is not satisfied (No in #6), the image data GD is identified as not including the line pair pattern 30.

Second Embodiment

A description will be given of an image processing apparatus 1B according to the second embodiment.

Figure 10:
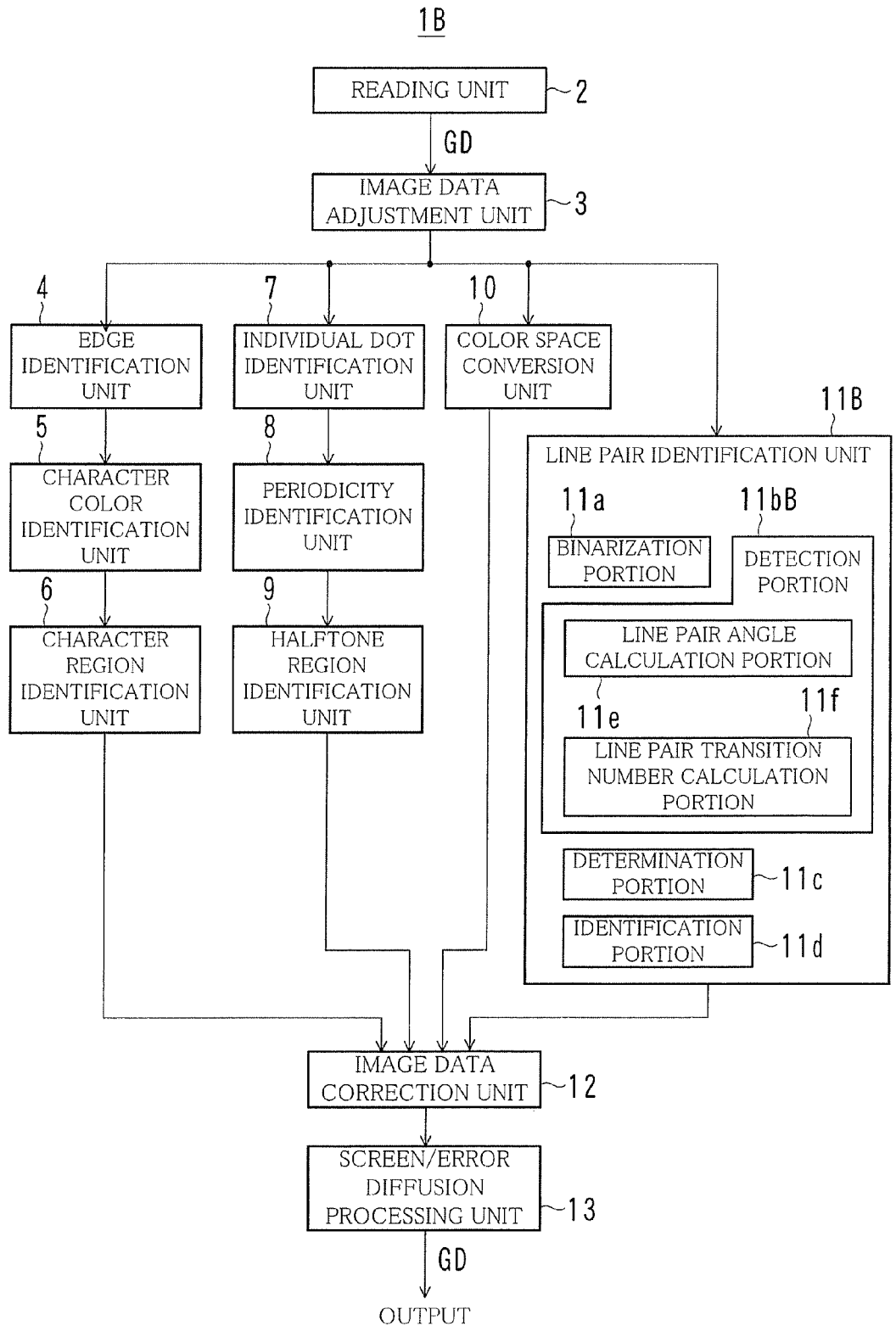
FIG. 10 is a block diagram illustrating the configuration of an image processing apparatus according to a second embodiment of the present invention.
Figure 11:
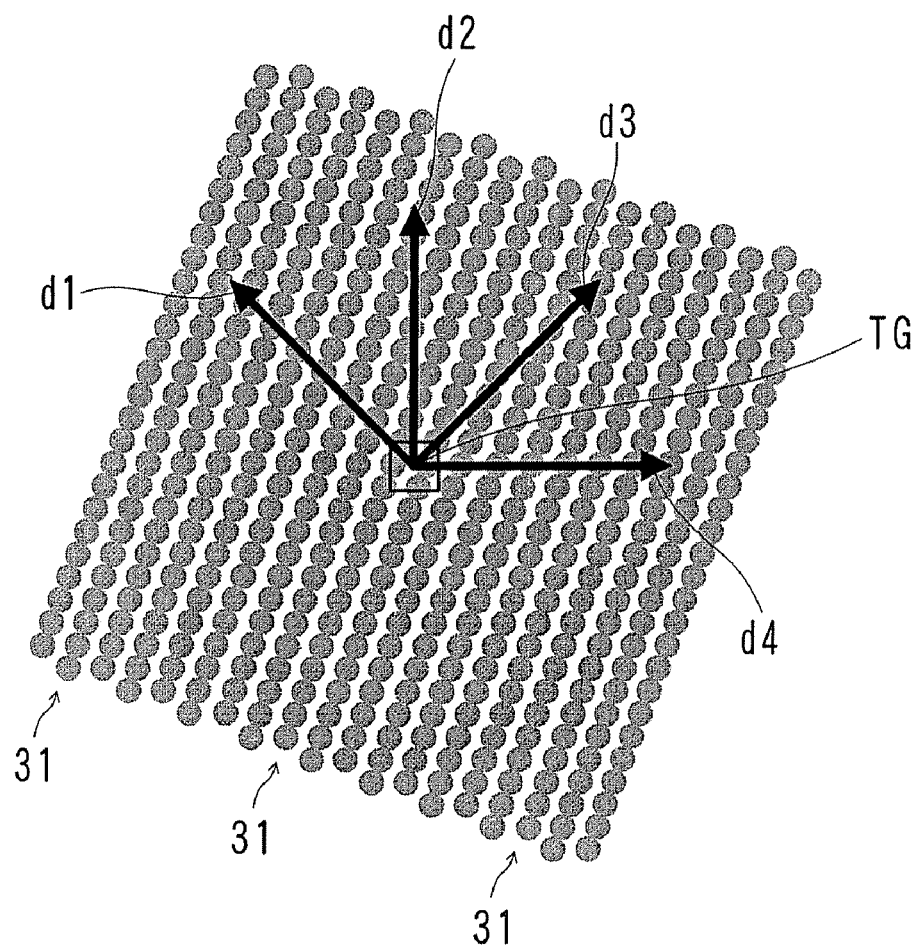
FIG. 11 is a diagram illustrating a method for calculating a true transition point in a line pair pattern.
Figure 12A:
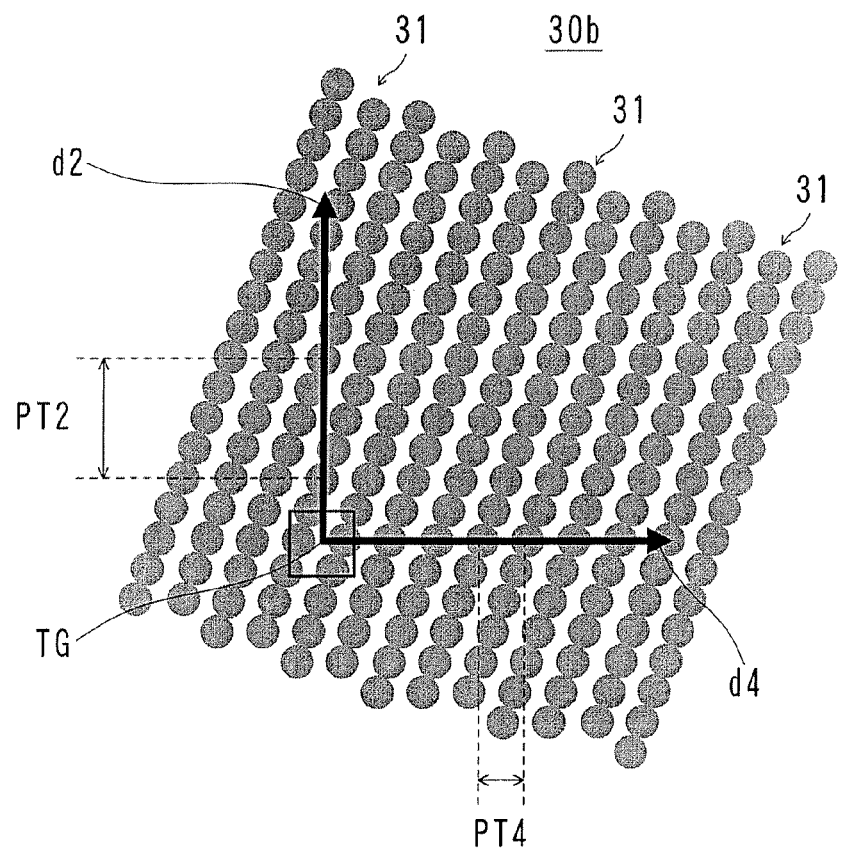
FIGS. 12A to 12C are diagrams illustrating a method for calculating an inclination of a line pair pattern.
Figure 12B:
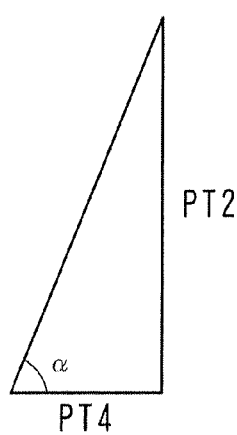
Figure 12C:
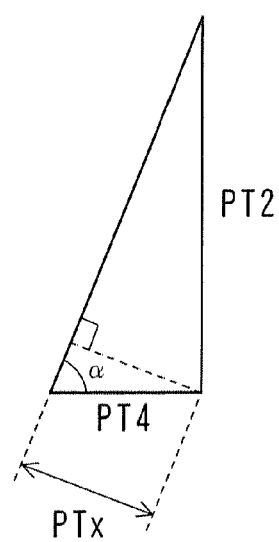
Figure 13:
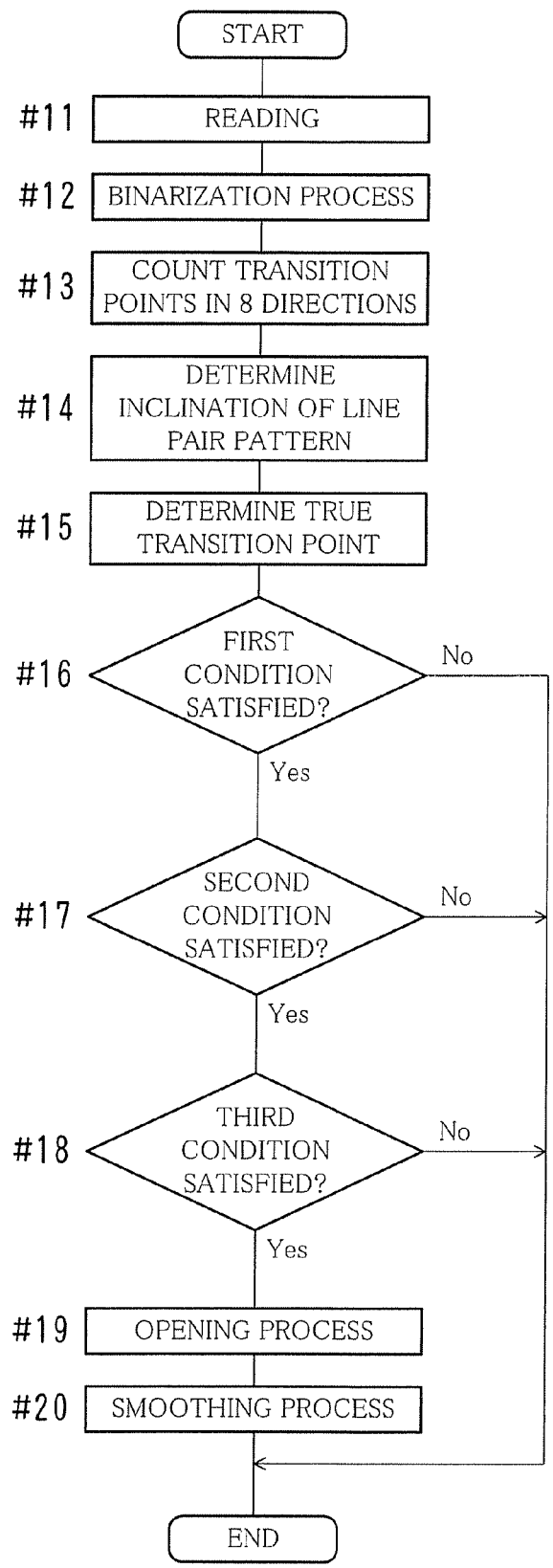
FIG. 13 is a flowchart illustrating a process for identifying a line pair pattern according to the second embodiment.

FIG. 10 is a block diagram illustrating the configuration of the image processing apparatus 1B according to the second embodiment, FIG. 11 is a diagram illustrating a method for calculating a true transition point in a line pair pattern 30b, FIGS. 12A to 12C are diagrams illustrating a method for calculating an inclination of the line pair pattern 30b, and FIG. 13 is a flowchart illustrating a process for identifying a line pair pattern 30.

In the second embodiment, mainly, a line pair identification unit 11B differs from the line pair identification unit 11 in the first embodiment. The configuration other than the line pair identification unit 11B in the second embodiment is the same as that of the image processing apparatus 1 according to the first embodiment. In FIGS. 10-13, similar reference numerals are used to denote structural elements that have the same functions as those of the image processing apparatus 1 in the first embodiment, and therefore a description of points that are shared with the first embodiment is omitted in the second embodiment.

As illustrated in FIG. 10, the image processing apparatus 1B is configured of: the reading unit 2; the image data adjustment unit 3; the edge identification unit 4; the character color identification unit 5; the character region identification unit 6; the individual dot identification unit 7; the periodicity determination unit 8; the halftone region identification unit 9; the color space conversion unit 10; the line pair identification unit 11B; the image data correction unit 12; the screen/error diffusion processing unit 13; and so on.

The line pair identification unit 11B includes: the binarization portion 11a; a detection portion 11bB; the determination portion 11c; and the identification portion 11d.

The detection portion 11bB detects the number of on-off transitions (the number of transition points) in a plurality of directions of an image based on image data binarized by the binarization portion 11a. The detection portion 11bB is provided with a line pair angle calculation portion 11e and a line pair transition number calculation portion 11f.

The line pair angle calculation portion 11e determines an inclination α of a line pair pattern based on the detected number of on-off transitions in the plurality of directions.

In this case, of the plurality of directions, a direction in which the number of on-off transitions is greatest is taken as a first direction. The inclination α is determined based on the number of on-off transitions in the first direction and the number of on-off transitions in a second direction. Stated differently, the pitch of line screen patterns in the first direction and the pitch of line screen patterns in the second direction are calculated and the inclination α is determined based on the calculated pitches. In this embodiment, the inclination α is an angle of a line screen pattern relative to a horizontal line (x-axis line).

As with the first embodiment, the plurality of directions in the second embodiment are eight directions, or directions d1 through d8 that are set at 45-degree angle intervals radiating out from the pixel of interest serving as an origin.

The line pair transition number calculation portion 11f determines the number of on-off transitions in a direction that is orthogonal to the line pair pattern based on the inclination α determined as described above.

The identification portion 11d identifies whether or not a line pair pattern is present in the image data based on the number of on-off transitions in the direction orthogonal to the line pair pattern.

The identification portion 11d determines that a line pair pattern is present in the image data if the number of on-off transitions in the direction orthogonal to the line pair pattern is greater than a predetermined threshold.

Further detailed description is provided below.

In the illustrated example of the first embodiment, the number of transitions in the line pair pattern 30 is counted radially at N-degree angle intervals. Accordingly, the number of directions in which to count the number of transitions is 360÷N, which results in a finite number. It is possible, however, that the inclination of the line pair pattern 30 is an arbitrary value. For this reason, it may be impossible for the method according to the first embodiment to detect the line pair pattern 30 appropriately depending on the value of an inclination of the line pair pattern 30.

More specifically, if an inclination α of a line pair pattern is the angle between the direction d2 and the direction d3, the transition points have a tendency to decrease. As illustrated in FIG. 6, for example, if the inclination α is the angle between the direction d2 and the direction d3, i.e., 67.5 degrees, the maximum value of the number of transition points decreases substantially.

As a result, a case arises in which when the number of transitions in a line pair pattern 30a to be detected is a value approximate to a reference value Q, the first condition is not satisfied depending on the value of the inclination α of the line pair pattern 30a. In such a case, a dot pattern is determined not to be a line pair pattern although it is inherently a line pair pattern.

Meanwhile, the detection portion 11bB in the second embodiment determines an inclination α of a line pair pattern, and, based on the inclination α, determines the number of on-off transitions in a direction that is orthogonal to the line pair pattern.

Referring to FIG. 11, the inclination α of each line screen pattern 31 in the line pair pattern 30b is 67.5 degrees.

The number of transitions from on to off or from off to on is counted in each of the directions d1 through d4, and the count value is taken as n. The count value n, i.e., the number of on-off transitions n indicates twice the number of line screen patterns 31, in other words, a type of resolution of the line pair pattern 30b.

In the illustrated example of FIG. 11, the number of on-off transitions n is 7 in the direction d1, the number of on-off transitions n is 3 in the direction d2, the number of on-off transitions n is 4 in the direction d3, and the number of on-off transitions n is 8 in the direction d4. In short, the number of on-off transitions n in the direction d4 is greatest, and the number of on-off transitions n in the direction d2 that is orthogonal to the direction d4 is smallest.

Referring to FIG. 12A, the two directions d4 and d2 are shown in the line pair pattern 30b. The pitch of the line screen patterns 31 in the direction d4 is denoted by PT4 and the pitch of the line screen patterns 31 in the direction d2 is denoted by PT2. The pitches PT4 and PT2 are obtained in the following manner: The length of counted regions (approximately 1.25 mm in the above-described example) in the directions d4 and d2 are divided by the number of on-off transitions n determined for the pitches PT4 and PT2, respectively. Note that the pitches PT4 and PT2 thus obtained are average.

Then, as illustrated in FIG. 12B, the pitches PT4 and PT2 are used to determine a true inclination α.

To be more specific, the inclination α can be found through the following formula: α=arctan(PT2/PT4)

The inclination α is found in this way, and thereby, a true maximum value of the number of on-off transitions in the counted region can be determined.

As illustrated in FIG. 12C, a pitch PTx is determined in a direction orthogonal to the inclination α.

To be more specific, the pitch PTx can be found through the following formula: PTx=PT4×sin α

The pitch PTx is used to determine a true maximum value of the number of on-off transitions.

The true maximum value of the number of on-off transitions may be determined by, for example, operation or a lookup table in which the inclination α or the pitch PTx is taken as input information.

For example, a lookup table in which the inclination α is taken as input information and a multiplying coefficient X(α) is taken as output information is used to multiply the maximum value of the number of on-off transitions in the directions d1 through d8 by the multiplying coefficient X(α), thereby to obtain the true maximum value of the number of on-off transitions.

In the example described above, the number of on-off transitions n is defined as a count value obtained by counting the number of transitions either from on to off or from off to on. The true maximum value of the number of on-off transitions, therefore, can be determined by dividing the length of a counted region by the number of on-off transitions n. Hereinafter, the number of on-off transitions defined as such a count value is sometimes referred to as "the number of tone transitions".

However, when the number of tone transitions is not used as the number of on-off transitions n, in other words, when the sum of the count values of the transition from on to off and the transition from off to on is used as the number of on-off transitions n as described in the first embodiment, the pitches PT4 and PT2 can be determined by calculation using the half of the determined number of on-off transitions n.

It is not always necessary to use the pitches PT4 and PT2 in order to determine the inclination α. Any value is possible so long as it is proportional to the pitches PT4 and PT2. Accordingly, the number of transitions used in the first embodiment may be used as it is. Alternatively, the number of transitions used in the first embodiment may be used as it is by using an appropriate coefficient or lookup table.

As discussed above, the image processing apparatus 1B according to the second embodiment determines a true number of transitions (transition points), thereby to detect or identify that a dot pattern is a line pair pattern appropriately even if the line pair pattern 30b has any inclination α. Stated differently, the image processing apparatus 1B can perform identification with high degree of accuracy without reducing the accuracy of identifying a line pair pattern having any inclination α.

Referring to the flowchart shown in FIG. 13, Steps #11 through #13 and #16 through #20 are the same as Steps #1 through #8 of the flowchart shown in FIG. 9, respectively.

In Step #14, an inclination α of a line pair pattern is determined. A true number of on-off transitions (the number of transition points) is determined based on the inclination α thus determined (Step #15).

In this way, a true number of on-off transitions is determined, thereby resulting in more appropriate identification of the line pair pattern 30.

In the first embodiment described earlier, as illustrated in FIG. 5, in the case where some counted regions in the directions d1 through d8 extend out of the line pair pattern 30, the greatest total value is selected from among the total values of the transition points in adjacent directions. Similarly, in the second embodiment, a step of selecting a combination in which the total values of the transition points is the greatest may be adopted prior to Step #14. This makes it possible to identify a line pair pattern 30 accurately even in the case illustrated in FIG. 5.

As described thus far, the embodiments enable the accurate identification of the line pair pattern 30 by using the first, second, and third conditions. A smoothing process can therefore be carried out on the identified line pair pattern 30, which makes it possible to prevent the occurrence of moiré patterns and textures when printing out the image.

Other Embodiments

In the above embodiment, in order to identify the third condition, or in other words, the periodicity condition, the counted region in the direction d1 was divided into two equal parts. However, the counted region may be divided into three or more parts in order to increase the reliability.

Finally, the configuration, processing content, processing order, and so on of the image processing apparatus 1 or 1B in its entirety or the various constituent elements included therein may be altered as appropriate within the spirit of the present invention. The abovementioned unique and distinguished effects can be attained in such a case as well.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
    a reader that reads a document and generates image data;
    a detector that detects a line screen pattern in a first direction in an image based on the image data generated by the reader and a line screen pattern in a second direction that is orthogonal to the first direction;
    an identifier that identifies whether or not a line pair pattern is present in the image data based on the difference in the number of the two line screen patterns detected by the detector;
    a binarization portion that binarizes the image data;
    wherein the detector detects the number of transition points between ON-pixels and OFF-pixels in the first direction and the number of transition points between ON-pixels and OFF-pixels in the second direction of an image based on the image data binarized by the binarization portion; and
    the identifier identifies whether or not a line pair pattern is present in the image data based on the difference in the number of transition points between ON-pixels and OFF-pixels in the first direction and the number of transition points between ON-pixels and OFF-pixels in the second direction.

2. The image processing apparatus according to claim 1, wherein the line screen pattern is a linear pattern configured of individual dots that have been connected; and
    the line pair pattern is a pattern configured of plural line screen patterns that have been arranged evenly.

3. The image processing apparatus according to claim 1, further comprising:
    an erosion processing portion that performs an erosion process on the image data that has undergone identification by the identifier.

4. The image processing apparatus according to claim 1, wherein the first direction is a direction, among eight directions set at 45-degree angle intervals radiating out from a pixel of interest, in which the number of transition points between ON-pixels and OFF-pixels is the greatest.

5. The image processing apparatus according to claim 1, further comprising:
    a determination portion that determines a periodicity of the number of transition points between ON-pixels and OFF-pixels.

6. The image processing apparatus according to claim 5, wherein the determination portion determines the periodicity based on the number of transition points between ON-pixels and OFF-pixels in each of counted regions, the counted regions being obtained by dividing a region in which the number of transition points between ON-pixels and OFF-pixels is counted in the first direction into a predetermined number of divisions.

7. The image processing apparatus according to claim 1, further comprising:
    an opening processing portion that performs an opening process on the image data that has undergone identification by the identifier.

8. An image processing apparatus comprising:
    a reader that reads a document and generates image data;
    a detector that detects a line screen pattern in a first direction in an image based on the image data generated by the reader and a line screen pattern in a second direction that is orthogonal to the first direction;
    an identifier that identifies whether or not a line pair pattern is present in the image data based on the difference in the number of the two line screen patterns detected by the detector;
    a binarization portion that binarizes the image data;
    wherein the detector detects the number of transition points between ON-pixels and OFF-pixels in a plurality of directions in an image based on the image data binarized by the binarization portion,
    the detector includes
        a line pair angle calculation portion that determines an inclination of a line pair pattern based on the detected number of transition points between ON-pixels and OFF-pixels in the plurality of directions, and
        a line pair transition number calculation portion that determines the number of transition points between ON-pixels and OFF-pixels in a direction orthogonal to the line pair pattern based on the determined inclination; and
    wherein the identifier identifies whether or not a line pair pattern is present in the image data based on the number of transition points between ON-pixels and OFF-pixels in the direction orthogonal to the line pair pattern.

9. The image processing apparatus according to claim 8, wherein, the line pair angle calculation portion defines, as the first direction, a direction, of the plurality of directions, in which the number of transition points between ON-pixels and OFF-pixels is greatest, and determines the inclination based on the number of transition points between ON-pixels and OFF-pixels in the first direction and the number of transition points between ON-pixels and OFF-pixels in the second direction.

10. The image processing apparatus according to claim 9, wherein the line pair angle calculation portion determines a pitch of the line screen patterns in the first direction and a pitch of the line screen patterns in the second direction based on the number of transition points between ON-pixels and OFF-pixels in the first direction and the number of transition points between ON-pixels and OFF-pixels in the second direction, and determines the inclination based on the determined pitches.

11. The image processing apparatus according to claim 8, wherein the identifier determines that a line pair pattern is present in the image data if the number of transition points between ON-pixels and OFF-pixels in the direction orthogonal to the line pair pattern is greater than a predetermined threshold.

12. The image processing apparatus according to claim 8, wherein the plurality of directions are eight directions that are set at 45-degree angle intervals radiating out from a pixel of interest serving as an origin.

13. A line pair pattern identification method comprising the steps of:
reading a document and generating image data;
detecting a line screen pattern in a first direction in an image based on the generated image data and a line screen pattern in a second direction that is orthogonal to the first direction;
identifying whether or not a line pair pattern is present in the image data based on the difference in the number of the two line screen patterns that have been detected;
binarizing the image data;
wherein in the step of detecting,
the number of transition points between ON-pixels and OFF-pixels in a plurality of directions in an image based on the image data binarized in the step of binarizing is detected,
an inclination of a line pair pattern is determined based on the detected number of transition points between ON-pixels and OFF-pixels in the plurality of directions, and
the number of transition points between ON-pixels and OFF-pixels in a direction orthogonal to the line pair pattern is determined based on the determined inclination; and
in the step of identifying, whether or not a line pair pattern is present in the image data is identified based on the number of transition points between ON-pixels and OFF-pixels in the direction orthogonal to the line pair pattern.

14. The line pair pattern identification method according to claim 13, wherein in the step of detecting, of the plurality of directions, a direction in which the number of transition points between ON-pixels and OFF-pixels is greatest is defined as the first direction, and the inclination is determined based on the number of transition points between ON-pixels and OFF-pixels in the first direction and the number of transition points between ON-pixels and OFF-pixels in the second direction.

15. A line pair pattern identification method comprising:
reading a document and generating image data;
detecting a line screen pattern in a first direction in an image based on the generated image data and a line screen pattern in a second direction that is orthogonal to the first direction; and
identifying whether or not a line pair pattern is present in the image data based on the difference in the number of the two line screen patterns that have been detected;
binarizing the image data;
wherein in the step of detecting, the number of transition points between ON-pixels and OFF-pixels in the first direction and the number of transition points between ON-pixels and OFF-pixels in the second direction in an image based on the image data binarized in the step of binarizing is detected; and
in the step of identifying, whether or not a line pair pattern is present in the image data is identified based on the difference in the number of transition points between ON-pixels and OFF-pixels in the first direction and the number of transition points between ON-pixels and OFF-pixels in the second direction.

16. The line pair pattern identification method according to claim 15,
wherein the line screen pattern is a linear pattern configured of individual dots that have been connected; and
the line pair pattern is a pattern configured of plural line screen patterns that have been arranged evenly.

17. The line pair pattern identification method according to claim 15,
wherein the first direction is a direction, among eight directions set at 45-degree angle intervals radiating out from a pixel of interest, in which the number of transition points between ON-pixels and OFF-pixels is the greatest.

18. The line pair pattern identification method according to claim 15, further comprising a step of:
performing an erosion process on the image data that has undergone identification in the step of identifying.

19. The line pair pattern identification method according to claim 15, further comprising a step of:
performing an opening process on the image data that has undergone identification in the step of identifying.

20. The line pair pattern identification method according to claim 15, further comprising a step of:
determining a periodicity of the number of transition points between ON-pixels and OFF-pixels.

21. The line pair pattern identification method according to claim 20,
wherein in the step of determining, the periodicity is determined based on the number of transition points between ON-pixels and OFF-pixels in each of counted regions, the counted regions being obtained by dividing a region in which the number of transition points between ON-pixels and OFF-pixels is counted in the first direction into a predetermined number of divisions.

22. An image processing apparatus comprising:
a reader configured to read a document and generate image data comprising a plurality of dark and light pixels;
a detector configured to detect in the image data a first quantity of transition points between dark pixels and light pixels along a first direction and a second quantity of transition points between dark pixels and light pixels along a second direction, wherein the first direction is orthogonal to the second direction; and
an identifier configured to identify whether a line pair pattern is present based on a difference between the first quantity of transition points and the second quantity of transition points.

23. A line pair pattern identification method comprising:
reading a document and generating image data comprising a plurality of dark and light pixels;
detecting in the image data a first quantity of transition points between dark pixels and light pixels along a first direction and a second quantity of transition points between dark pixels and light pixels along a second direction, wherein the first direction is orthogonal to the second direction; and
identifying whether a line pair pattern is present based on a difference between the first quantity of transition points and the second quantity of transition points.

* * * * *